United States Patent [19]

Eller et al.

[11] Patent Number: 5,961,076
[45] Date of Patent: Oct. 5, 1999

[54] MODULAR SPACECRAFT DEVELOPMENT PROCESS

[75] Inventors: Howard S. Eller, Redondo Beach; Ramon Coronel, Torrance, both of Calif.

[73] Assignee: TRW Inc., Redondo Beach, Calif.

[21] Appl. No.: 08/771,464

[22] Filed: Dec. 20, 1996

[51] Int. Cl.$^6$ .................................................. B64G 1/00
[52] U.S. Cl. ........................................................ 244/158 R
[58] Field of Search ........................................ 244/158 R

[56] References Cited

U.S. PATENT DOCUMENTS

| | | | |
|---|---|---|---|
| 5,152,482 | 10/1992 | Perkins et al. | 244/158 R |
| 5,314,146 | 5/1994 | Chicoine et al. | 244/158 R |
| 5,474,262 | 12/1995 | Fiore | 244/158 R X |
| 5,518,209 | 5/1996 | Chicoine et al. | 244/158 R |
| 5,624,088 | 4/1997 | Fiore | 244/158 R |
| 5,755,406 | 5/1998 | Aston et al. | 244/158 R |

FOREIGN PATENT DOCUMENTS

| | | |
|---|---|---|
| 2018211 | 2/1979 | United Kingdom . |
| WO9200223 | 6/1991 | WIPO . |

OTHER PUBLICATIONS

Tomonao Hayashi, "Development of Small Satellite Weighing Less Than 17 kg," NEC Research and Development, No. 93, Apr. 1989, Tokyo, Japan, pp. 73–78.

*Primary Examiner*—Charles T. Jordan
*Assistant Examiner*—Theresa M. Wesson
*Attorney, Agent, or Firm*—Michael S. Yatsko

[57] ABSTRACT

A process for designing and producing spacecraft more efficiently, without the excessive time, complexity and expense usually associated with spacecraft design. The process moves the design complexity usually associated with spacecraft design to payload modules whose designs are potentially reusable in other spacecraft missions. Each module is designed to be largely independent of a parent spacecraft structure, the design of which can be simplified to accommodate multiple modules that connect to the parent structure through a standardized backbone interface. Each module is designed for independent structural integrity, and to provide its own thermal management. Modules may also provide their own power regulation and, optionally, their own power storage and generation capabilities. Modules may also provide their own attitude control systems. Attachment of modules to the parent structure is simplified because of the modules' independence. The backbone interface may, for example, simply provide a data bus connection, an unregulated power connection, and possibly a radio-frequency (RF) connection. This simplicity of attachment of the modules results in an extremely simple system-level design and a correspondingly simple integration and test procedure, thereby simplifying the entire design and development process.

17 Claims, 5 Drawing Sheets

MODULAR SPACECRAFT DEVELOPMENT PROCESS

BACKGROUND OF THE INVENTION

This invention relates generally to the design and development of spacecraft and, more particularly, to the design of unmanned spacecraft, such as earth-orbiting satellites. Traditionally, each spacecraft is considered unique to its intended purpose or mission. In general, a spacecraft includes a combination of complex subsystems, for performing such functions as propulsion, communications, power generation and storage, attitude control, and thermal control. Each subsystem has different requirements and specific functions, depending on the spacecraft mission. Even a simple spacecraft may have subsystems with hundreds of components that have to be uniquely interconnected and controlled to perform as required.

The process of spacecraft design, prior to the present invention, requires the designers to specify all of the complex interconnections among the subsystems and other components, and later to perform rigorous and costly integration and testing of all these components. Integration and testing at this high level of complexity is very manpower intensive, and typically benefits only a single spacecraft design. The high level of design complexity, coupled with the need to change the design for each mission, results in long, expensive, non-recurring development cycles, the cost of which can exceed by many times the recurring cost of individual spacecraft.

Some designers have introduced the concept of a standard spacecraft "bus," the intended purpose of which is to provide an "standard" vehicle for different space missions. However, such so-called standard buses often need many customizing modifications from one mission to the next. Even identical units used on the same spacecraft often require individual analysis, accommodation and documentation due to varying placement, orientation and accommodation within a spacecraft. Some initial progress has been made in reducing design cost by using standardized connector hardware and data buses for transmission of data between components or subsystems. Even with these standardized features, however, the spacecraft design process still requires an extremely costly design effort and a rigorous and detailed system integration and testing phase.

Spacecraft currently use external box structures to house electronics grouped by payload or bus functions. Typically, many such boxes are used on a single spacecraft, and a massive wiring harness interconnects the maze of boxes. Data buses are used only sparingly to reduce harness weight. Payloads are usually grouped on two or more thermally optimized panels with non-standard interconnections between panels, bus and antennas. Any change or addition of components normally disrupts the entire system-level design and often requires changes in the mechanical layout, the electrical interconnections or the thermal design. From one mission to the next, changes may have to be made in the payload throughput, propulsion system parameters, electrical power supply, wiring harness, thermal design or processor capabilities. Changes of this type greatly limit the amount of design reuse from one mission to the next, even when so-called standard spacecraft buses are used.

Ideally, a new spacecraft design process is needed, to provide shortened production schedules and increased reuse of existing designs, but without limiting mission flexibility. As will shortly become apparent from the description that follows, the present invention meets and exceeds these goals.

SUMMARY OF THE INVENTION

The present invention resides in a spacecraft design process that provides for a shortened development time, minimizes system-level design complexity and maximizes design reuse. Briefly, and in general terms, the process of the invention comprises, first, selecting a parent spacecraft structure, a propulsion system, a plurality of spacecraft payload modules to perform functions required by the mission, and any needed additional spacecraft components. The parent spacecraft structure is selected to be large enough to accommodate attachment of the propulsion system and also large enough to accommodate attachment of the plurality of spacecraft payload modules. A further important step is designing each of the plurality of spacecraft modules that have not already been designed, to operate independently of the parent spacecraft structure, except for a selected very small number of services provided by the parent structure. With this approach, any necessary complexity in spacecraft design will be constrained to reside within the modules themselves. Once the modules are selected and separately designed, the succeeding steps are manufacturing and testing the spacecraft modules; assembling the tested spacecraft modules, the additional spacecraft components and the parent structure; and, finally, testing the assembled spacecraft to ensure that it will operate as intended to perform the mission.

More specifically the step of designing each of the spacecraft modules includes designing the module to have independent structural integrity; and designing the module to have a sufficiently large thermal radiator to be thermally independent of the parent structure. The process may further include designing the module to have a power management capability independent of the parent structure. The power management capability may include power regulation, power storage and power generation.

Assembling the spacecraft includes attaching each of the spacecraft modules to the parent structure through a standardized backbone structure that interconnects the modules. The backbone structure carries signals and services to or from the modules. It includes, for example, a data bus for carrying data signals to and from the modules, a power bus for supplying unregulated power to the modules, and a radio-frequency (RF) bus for transferring RF signals to or from modules.

The process of the invention greatly simplifies the system-level design process because any design complexity of the spacecraft is constrained to be within the modules, rather than in their interconnections. With each module largely independent of services that would otherwise need to be supplied by the parent structure, both the parent spacecraft structure the overall system-level design of the spacecraft are very simple. Consequently, integration and testing of the spacecraft modules is also reduced to a simple procedure. Any changes in the design of a module can made with minimal impact on the system design. Even if module changes necessitate repetition of integration and testing, such changes would be unlikely to introduce large scheduling delays.

It will be appreciated from the foregoing that the present invention represents a significant advance in the field of spacecraft design. In particular, using the process of the invention reduces both non-recurring and recurring costs of developing spacecraft, reduces the time to develop a new spacecraft, reduces the number of configured components included in a spacecraft, allows design changes to be more easily accommodated, reduces spacecraft weight, increases the probability of design reuse, increases the use of standardized components, and increases the available storage volume for a given launch vehicle. Other aspects and advantages of the invention will become apparent from the following more detailed description.

DESCRIPTION OF THE PREFERRED EMBODIMENT

Figure 1:
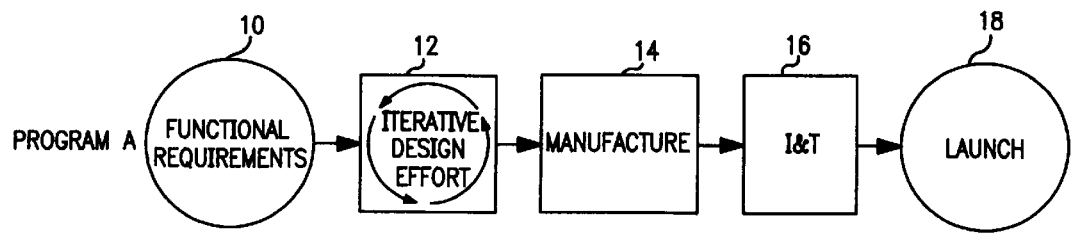
FIG. 1 is a block diagram depicting a current spacecraft development process of the prior art.

As shown in the drawings for purposes of illustration, the present invention pertains to a process for designing spacecraft. While the process of the invention is described and illustrated in the context of designing unmanned spacecraft, such as earth-orbiting satellites, the same principles are applicable to other types of spacecraft, whether manned or unmanned. In the past, the design of a spacecraft for a specific mission has been undertaken as a unique and complex design effort that specifies all the interconnections of the spacecraft subsystems and components. This is followed, after manufacture, by an equally complex effort to integrate and test the interconnected subsystems and components. The resulting spacecraft was thus uniquely customized to meet its mission requirements, but the required design and development effort was of little use in adapting the vehicle for use in other missions.

FIG. 1 shows this prior art process in diagrammatic form. The functional requirements for a mission, indicated by block 10, are provided or input to an iterative design effort, indicated by block 12. The design effort 12 represents a lengthy and complex, cooperative venture involving a design team that includes personnel associated with the various spacecraft systems and subsystems. The design team produces detailed specifications for the various interconnections between subsystems and their components. Specific interfaces for the exchange of data, power and control signals are established. Structural details are specified for each of the subsystems. Thermal properties are estimated and provided for, because a critical aspect of spacecraft design is ensuring that heat generated in its components is adequately dissipated. As indicated in block 12, this design effort is iterative in nature. A significant change in any subsystem may necessitate changes elsewhere, such as in interconnection design, thermal design, or propulsion design. These design iterations continue until each subsystem designer is satisfied with the result, and the designers of the entire spacecraft are satisfied that the vehicle will perform its desired mission. The process may take many months, or even years, to complete.

After the design effort 12, the subsystems and components of the spacecraft are manufactured, as indicated in block 14. Because the design is unique, the manufacturing process makes only limited, if any, use of available subsystems, but may use off-the-shelf components, such as fuel valves or electrical switches, at a very specific design level. After this manufacturing phase, the vehicle is far from complete. The unique and complex design necessitates a correspondingly complex integration-and-test (I&T) effort, indicated by block 16, before launch (18) of the vehicle. Integration and testing employs the design specifications that were generated in the iterative design effort 12, with each subsystem or component interface being individually tested to make sure that the design specifications have been satisfied. In some instances, defects in the original design may be uncovered at this stage, requiring modifications to the original design and manufactured components. Even if no such defects are found, the integration and test effort, like the design effort, makes high demands on the technical personnel involved and takes many hours of work. More important from a cost standpoint is the fact that the costs of the iterative design effort 12 and the integration and test effort 16 cannot be spread over subsequent missions, which in most cases require that the whole effort be repeated for a different set of functional requirements.

Figure 2:
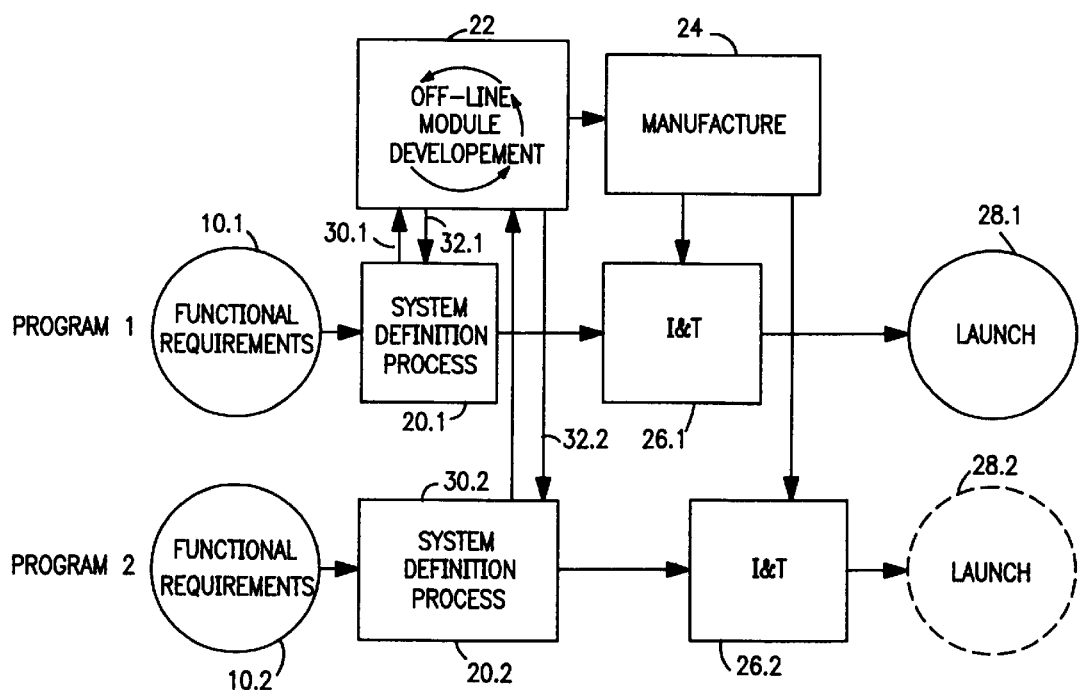
FIG. 2 is a block diagram depicting the spacecraft design and development process of the present invention.

In accordance with the present invention, spacecraft functions are 5 performed in modules that are largely independent of each other in many respects, such that the processes of system definition and integration and test are greatly reduced in complexity. The concept is illustrated in FIG. 2. For a first spacecraft program, referred to in the drawing as Program 1, the functional requirements 10.1 of the program are supplied to a system definition process 20.1 for that program. A significant feature of the design process of the invention is the "off-line" development 22 of spacecraft modules. In this context, "off-line" development means that the modules are designed independently of the system definition process, and in such a way that they can be reused in other spacecraft missions. The modules are then manufactured as indicated in block 24, are integrated and tested in an integrate-and-test (I&T) effort 26.1, and the spacecraft is launched, as indicated at 28.1.

As indicated diagrammatically by line 30.1, the system definition process 20.1 provides a relatively simple set of interface specifications to the module development efforts 22. For the most part, however, each module is designed to perform some, if not all, of the functions normally undertaken by a centralized spacecraft "bus." As in some conventional spacecraft, each module performs its own "payload" functions and data management functions. For a communications satellite, for example, payload functions may include operation of digital and radio-frequency (RF) module functions. In addition, modules designed in accordance with the inventions will be responsible for performing some or all of its structural, thermal, power supply and attitude control functions. As will be further explained below, each module is designed to be structurally integrated into the spacecraft through a uniform module interface, which is specified to the module development process 2 as as indicated by line 30.1. This line in the figure also represents a module selection aspect of the system definition process. The off-line module development process 22 results in the generation of a catalog of modules, each of which can be selected in the system definition process, for reuse with little or no modification.

Each designed module provides a relatively simple set of system parameters to the system definition process 20.1, as indicated by line 32.1. The system definition process 20.1 generates a set of system definitions for the integrate-and-test process 26.1, as indicated by line 34.1. In contrast with system design parameters generated in the traditional iterative design process, the definitions generated for the integrate-and-test process 26.1 are relatively simple because the complexity of module interconnection has been drastically reduced. Consequently, after manufacture (24), the integrate-and-test function 26.1 is similarly reduced in complexity. The modules are simply assembled onto the spacecraft using the uniform interface mentioned earlier, and the test procedure is reduced to a formalistic and relatively simple procedure. In one embodiment of the invention, testing can be performed by a test module, which is designed with the other modules in the module development process 22, and than activated during the integrate-and-test process 26.1, to perform a set of predefined tests on the various modules to ensure that they perform their desired functions and interface properly with each other. The test module, unlike other modules, is specific to the functional requirements of the mission or program, may not be reusable without modification.

The lower portion of FIG. 2 illustrates a parallel process for designing a spacecraft for a second program or mission, designated Program 2. This process uses separate functional requirements 10.2, a separate system definition process 20.2, a separate integrate-and-test process 26.2 and a separate launch event 28.2, but may employ a common off-line module development effort 22 and manufacturing phase 24.

Figure 3:
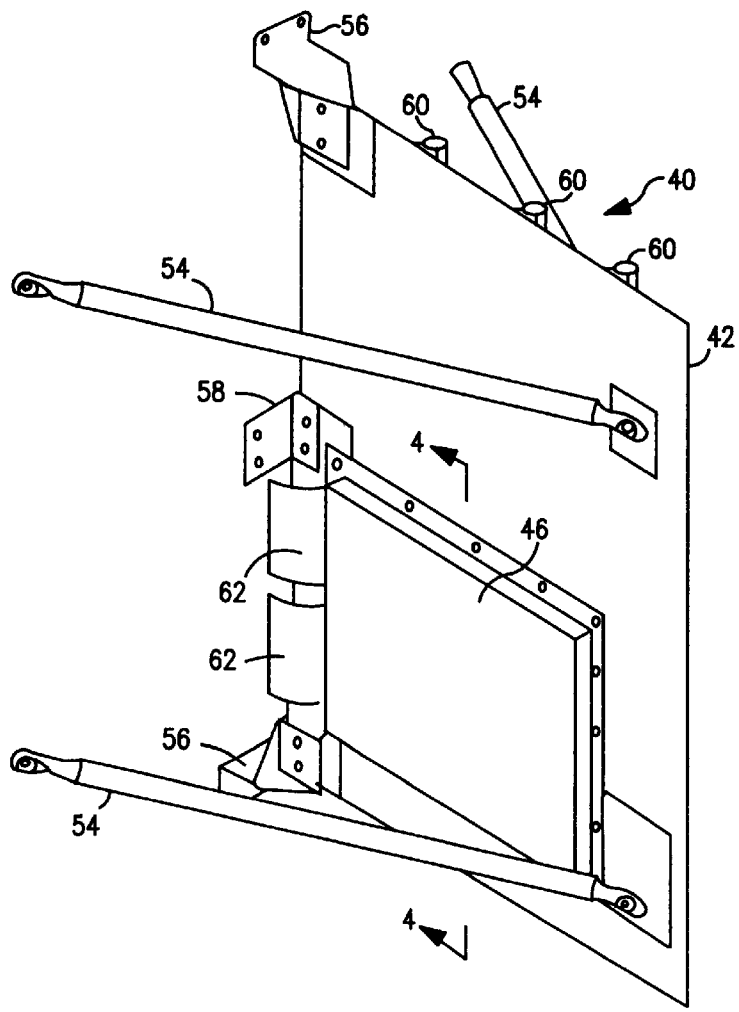
FIG. 3 is an isometric view of a spacecraft module and mounting structure of the type that could be used in implementing the present invention.
Figure 4:
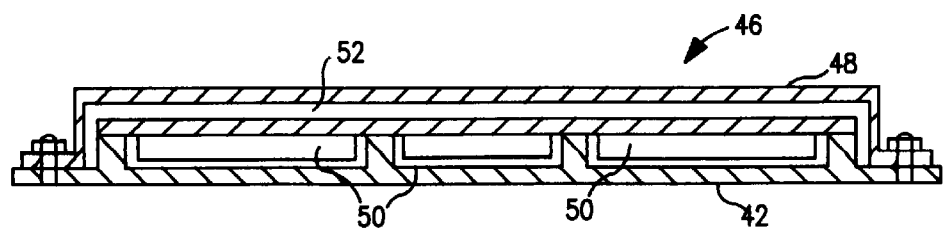
FIG. 4 is a cross-sectional view taken generally along the line 4—4 of FIG. 3 and depicting an electronics payload component housed on the spacecraft module.

By way of more specific example, FIG. 3 depicts the structural details of a spacecraft module 40 of a type that can be used in the present invention. The module 40 in this example is structured on a flat, generally rectangular radiator panel 42, which, as will be seen in subsequent figures, attaches to a parent structure, shown in FIG. 5 as a single cylinder 44. The parent structure can be very simple and light in weight because each module 40 is structurally self-sufficient from its points of attachment to the parent structure 44. The module 40 includes an electronics element 46 mounted on the panel 42 and protected by a radiation cover 48. The electronics element 46, as shown in FIG. 4, includes electronic and RF elements 50 mounted on a circuit board 52 installed under the cover 48. The module 40 has a set of structural supporting brackets 54, 56 and 58 for attachment to the parent structure 44. The radiation panel 42 is nominally two-sided, for thermal radiation in two directions, but can be used as a single-sided radiator, as when mounted parallel to the supporting or parent structure. Heat pipes, portions of which are shown at 60, can be used to increase the thermal efficiency and capacity of the radiator 42.

Interfaces, shown diagrammatically at 62, are provided for connection to a "backbone" structure (not shown in FIG. 3) through which multiple modules are interconnected and attached to the parent spacecraft structure 44. This disciplined interconnection interface replaces wiring harnesses presently used to interconnect modules. Although various configurations are contemplated, by way of example the interfaces 62 can provide payload, RF and power connections to the module 40, through connectors that are effectively shielded against electromagnetic interference (EMI). Each module 40 is designed to be structurally self-sufficient, to have integral thermal control and switching capability, and stand-alone power management capability. Data interface to the module 40 is made through a commercially available data bus (not shown).

For a particular system design, modules 40 can be added or deleted without impacting the complexity of the design at a system level. The only significant limiting factor is the maximum capacity of the parent structure 44 and any associated solar arrays. In effect, the modular design of the system tends to move complexity inside the individual module boundaries and dramatically reduce system level complexity and design requirements.

Figure 5:
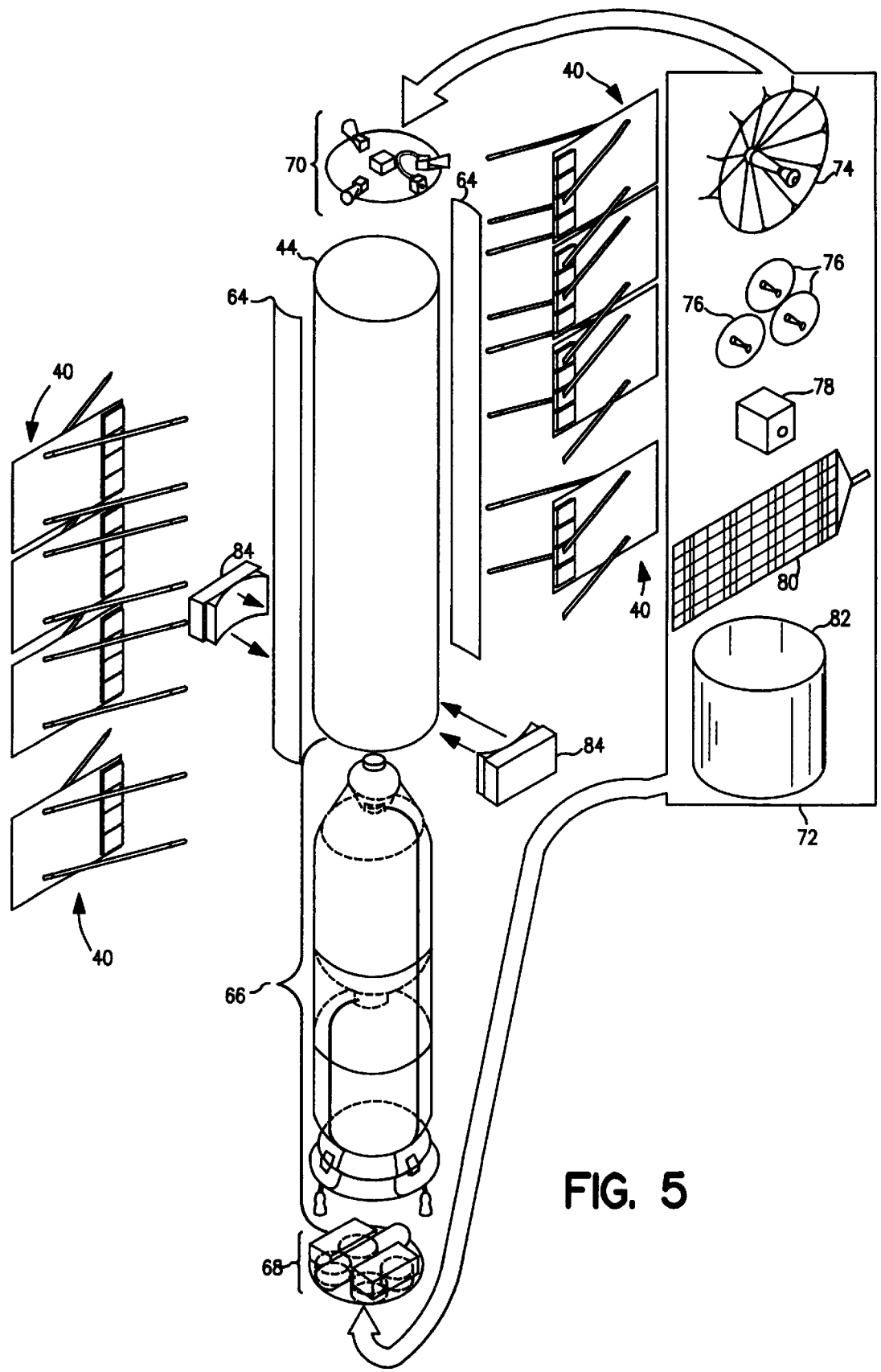
FIG. 5 is an exploded isometric view of a spacecraft configuration employing the principles of the invention and depicting various available components.

FIG. 5 is an exploded view of a spacecraft designed in accordance with the invention, including a plurality of modules 40 shown spaced away from the parent structure 44. In this illustrative configuration, the modules 40 are arranged in two rows on diametrically opposite sides of the cylindrical parent structure 44. The strips 64 are part of the power/data/payload interface backbone mentioned above. The configuration illustrated is a useful one because it orients all of the modules to radiate in two opposed directions. In the case of an earth-orbiting satellite, in an equatorial or nearly equatorial orbit, sunlight falls on the vehicle alternately from the east and west directions. The north and south exposures of the spacecraft are those that are least subject to the sun's radiation and, therefore, are most useful for radiating thermal energy from the vehicle.

The exploded view of FIG. 5 shows other aspects of the spacecraft's modular design. A chemical propulsion system 66 is housed inside the cylindrical parent structure 44 and an electrical propulsion system 68 is mounted at the aft end of the structure 44. Indicated at 70 is a standard attitude control system (ACS) module, which is end-mounted onto the parent structure 44. Other components shown within the rectangle 72 may be either end-mounted or side-mounted. These include a single umbrella antenna 74, multiple antenna dishes 76, payload instruments 78, an articulated, flat-panel solar array 80 and a fixed, cylindrical solar array 82. Shown for mounting on the outer cylindrical face of the parent structure 44 is a pair of battery modules 84.

A goal of the method of the present invention is to minimize the complexity of system-level design. A number of factors make this possible:

- The standard structures employed are simple, nearly single element standard structures.
- The propulsion modules 66 and 68 and attitude control system module 70 are standardized.
- The spacecraft modules 40 contain stand-alone spacecraft avionics and payload avionics components and have independent thermal, structural and some level of power management capability.
- The standardized backbone structure 64 establishes power, data and payload interconnections with and between the modules 40.
- Integrated high-frequency and payload antenna modules are employed to reduce the number of components.
- Low-frequency antennas use standard, bolt-on interfaces for connection to the parent structure 44.
- A standard antenna gimbal mounting is used, with integrated control electronics and optional power converter.
- A standard articulating solar array 80 and non-articulating amorphous silicon solar array 82 are used.
- An optional bolt-on power control and storage module is available.

Avionics units in the spacecraft modules 40 are programmable to facilitate changes in the functionality of the avionics.

Using the spacecraft modules 40 and other modular "building blocks" described above, the spacecraft design process at a system level reduces to a set of very simple steps:

1) Selecting an appropriate (standardized) size for the parent structure 44 based on the a preferred launch vehicle fairing envelope and mission requirements.
2) Selecting an appropriate propulsion module closest the needs of the mission.
3) Selecting from a catalog of available spacecraft modules based on the functional needs of the mission.
4) Developing any additionally needed spacecraft modules using the standardized backbone interface and other standardized specifications;
5) Arranging the spacecraft modules 40 and other components along and around the parent structure 44 to optimize system performance.
6) Manufacturing and testing all modules and components not available off the shelf.
7) Integrating and testing the spacecraft modules and components, and verifying system-level performance.

Figure 6:
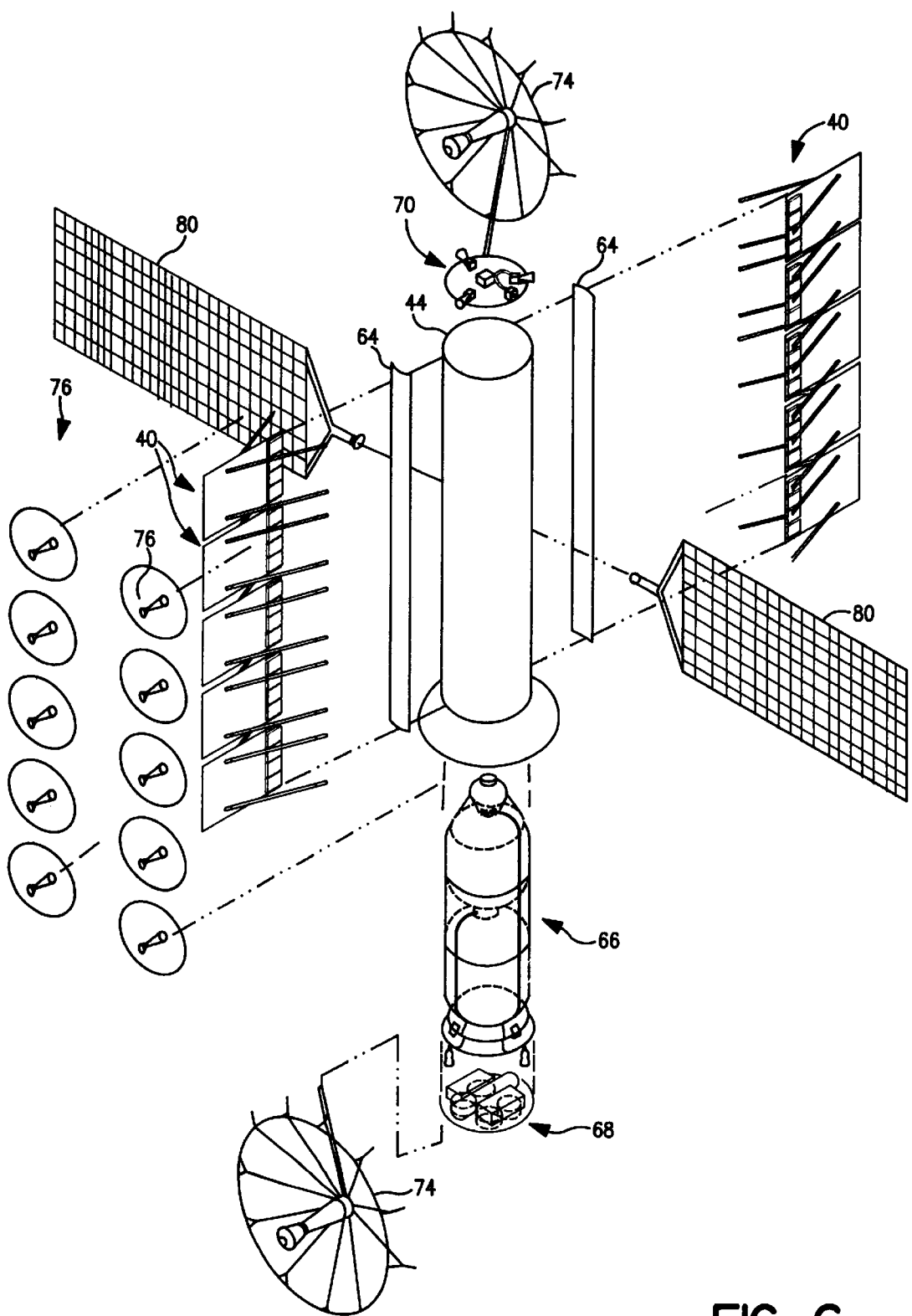
FIG. 6 is an exploded isometric view of a typical spacecraft configuration using components selected from those shown in FIG. 5.
Figure 7:
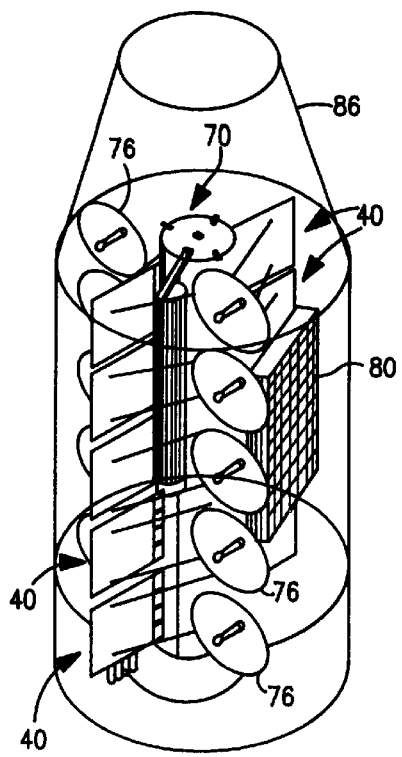
FIG. 7 is an isometric view of the spacecraft configuration of FIG. 6 with all of its components stowed for launch.
Figure 8:
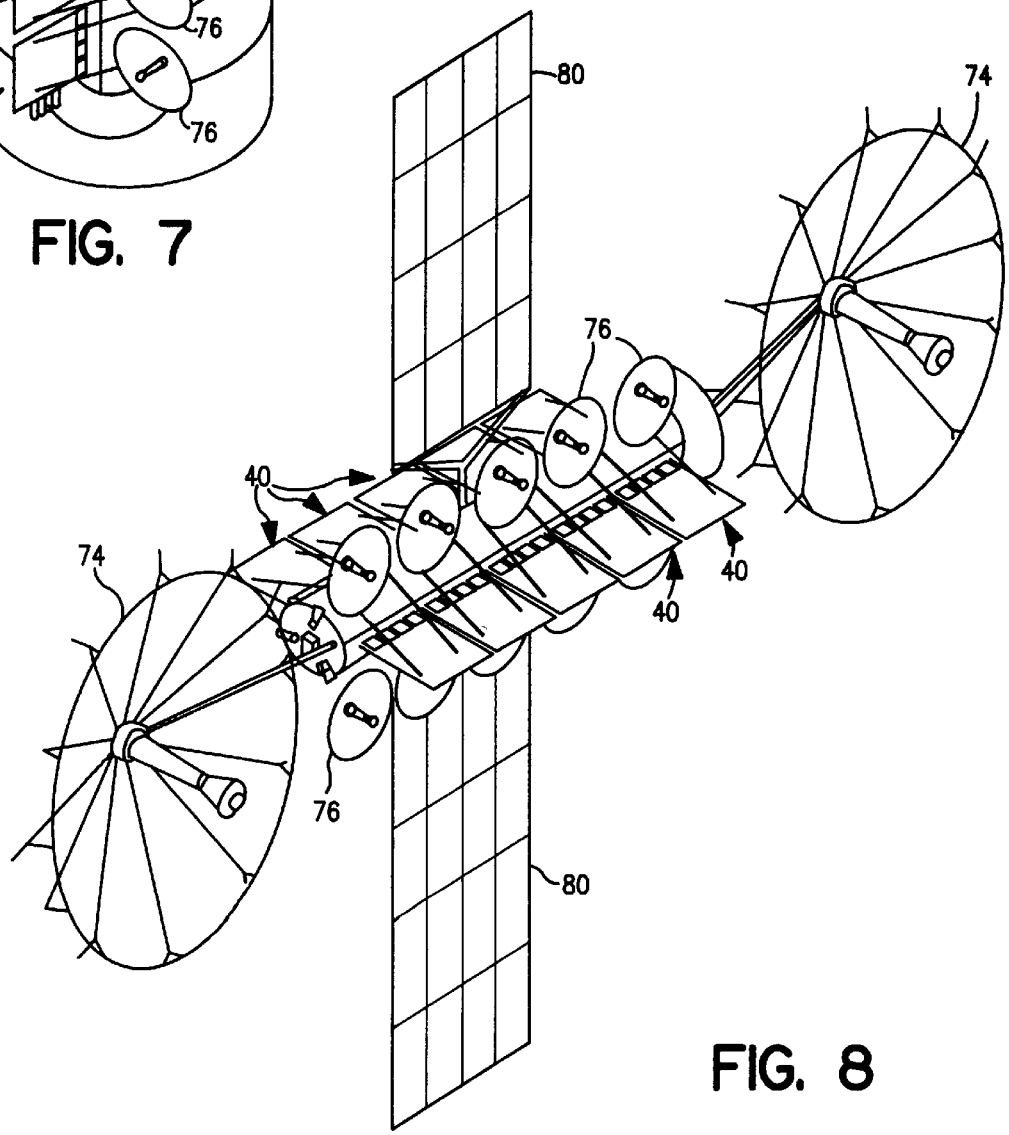
FIG. 8 is an isometric view of the spacecraft configuration of FIGS. 6 and 7, with all of its components deployed for operation in space.

FIG. 6 is an exploded view of a spacecraft using components and modules selected from those shown in FIG. 5, including two end-mounted umbrella antennas 80 and two side-mounted articulated flat solar arrays 80. FIG. 7 shows the same spacecraft configuration stowed inside a launch vehicle fairing, which is shown in outline at 86. Finally, FIG. 8 shows the same spacecraft configuration as FIGS. 6 and 7, but with all of its components deployed as they would be in space.

As discussed above, the invention provides for the use of spacecraft modules that are self-sufficient in many respects, in contrast to spacecraft avionics modules of the past, which depended on a central bus for most of their important support functions. Spacecraft of the prior art have, of course, used modules to house various payload avionics functions and some have used data buses to distribute a data management function. To some degree, some spacecraft of the prior art have also distributed the thermal control function by externally mounting each avionics module. The present invention, however, goes beyond this and decentralizes other critical spacecraft functions as well. The possibilities for decentralizing spacecraft functions in accordance with the invention is summarized in the following table:

|  | Level of Module Independence | | |
|---|---|---|---|
| Subsystems Functions | Functionally Independent | Self-sufficient Payload | Full-function Modules |
| Payload | | | |
| Digital | X | X | X |
| RF | X | X | X |
| Data Mngmnt. | X | X | X |
| Thermal | X | X | X |
| Structural | X | X | X |
| Power | | | |
| Regulation | | X X X | X |
| Storage | | X X | X |
| Generation | | X | X |
| ACS | | | |
| Sensors | | | X |
| Wheels | | | X |

As indicated in the table, in the configuration referred as "functionally independent," each module performs not only its own payload, data management and thermal functions, but it is also structurally independent, in the sense that it does not rely on the parent structure 44 for structural support during launch and when in operation. In the "self-sufficient payload" configuration, some level of power system autonomy is also assumed by the spacecraft modules. As indicated, there are three separate versions of this configuration, depending on whether the modules perform power regulation, power regulation with power storage, or power regulation, storage and generation functions. If only the regulation function is performed, "raw" unregulated power is supplied through the backbone interface 64 to each module 40, which then assumes the responsibility for conforming the power supply to its own voltage or other requirements. If power storage is also decentralized, each module 40 also includes a battery (not shown), such as a small 2.5 volt battery. If the power generation function is also decentralized to the modules 40, all or some of the modules will also include a solar array. In the full-function module category, the module also performs attitude control system (ACS) functions. Thus, a module may include a star sensor or other device to sense its attitude, and inertial wheels to perform attitude adjustments.

It will be appreciated from the foregoing that the present invention represents a significant advance in the field of spacecraft design. In particular, the invention fulfills a long-felt need for a more efficient and lower cost technique for designing spacecraft for selected missions. The method of the invention effectively moves the complex functionality of spacecraft to within separately designed modules, which attach in a simple manner to the parent structure of the spacecraft. System design of the spacecraft then reduces to a series of very simple steps, and integration and testing of the spacecraft are similarly very simple tasks in comparison to their complexity in conventionally designed spacecraft. It will also be appreciated that, although a small number of specific spacecraft and module configurations have been disclosed by way of example, the present invention applies more broadly to a variety of module designs and spacecraft configurations. Accordingly, the invention should not be limited, except as by the appended claims.

What is claimed is:

1. A spacecraft design and implementation process, comprising the steps of:

preparing detailed design and manufacturing specifications for a plurality of spacecraft payload modules, each of which is capable of performing not only a selected payload function, but also a data management function if called for by the selected payload function, and at least one other non-payload function selected from the group of steps comprising of providing structural integrity, providing power management and providing attitude control, wherein the spacecraft payload modules for which specifications are prepared in this step are useable in multiple spacecraft configurations;

designing a spacecraft configuration for a specific mission, by selecting from the spacecraft payload modules for which specifications were prepared in the foregoing step, selecting a fundamental core vehicle, and selecting propulsion and other standardized spacecraft components needed to support the fundamental core vehicle;

preparing detailed design and manufacturing specifications for any additional payload spacecraft modules needed for the specific mission but not already prepared;

manufacturing and testing all of the payload spacecraft modules in accordance with the prepared detailed design and manufacturing specifications;

assembling the manufactured and tested spacecraft modules, propulsion and other standardized spacecraft components onto the fundamental core vehicle; and testing the assembled modules and components to ensure performance in accordance with specifications.

2. A process as defined in claim 1, wherein:

the step of designing a spacecraft configuration includes selecting a size for the core vehicle and selecting a propulsion module, consistent with the spacecraft mission.

3. A process as defined in claim 1 wherein:

the steps of preparing detailed design and manufacturing specifications for the spacecraft payload modules includes specifying that the modules have independent structural integrity for launch and operational conditions.

4. A process as defined in claim 3, wherein:

the steps of preparing detailed design and manufacturing specifications for the spacecraft payload modules includes specifying that the modules include power regulation apparatus.

5. A process as defined in claim 4, wherein:

the steps of preparing detailed design and manufacturing specifications for the spacecraft payload modules includes specifying that the modules include a power storage capability.

6. A process as defined in claim 5, wherein:

the steps of preparing detailed design and manufacturing specifications for the spacecraft payload modules includes specifying that the modules include a power generation capability.

7. A process as defined in claim 6, wherein:

the steps of preparing detailed design and manufacturing specifications for the spacecraft payload modules includes specifying that the modules include an attitude control system.

8. A process as defined in claim 1, wherein:

the step of assembling the manufactured and tested spacecraft modules onto the core vehicle includes attaching each of the modules through a standardized backbone structure that interconnects the modules.

9. A process as defined in claim 8, wherein:

the backbone structure carries data signals to and from the modules, and carries unregulated power to the modules.

10. A process for designing and building a spacecraft, for a given mission, the process comprising the steps of:

selecting, for a given mission, a parent spacecraft structure, including a core vehicle of already known specifications, a propulsion system, and any additional spacecraft modules needed to support the parent spacecraft;

selecting a plurality of spacecraft payload modules from a catalog of available spacecraft payload modules for which there are known specifications, wherein each of the available spacecraft payload modules includes a capability for performing at least one support service independently of the parent spacecraft;

if a payload function needed for the mission is not found in the catalog of available spacecraft payload modules, preparing design and manufacturing specifications for an additional spacecraft payload module, which also includes a capability for performing at least one support service independently of the parent spacecraft;

manufacturing and testing the spacecraft payload modules and the parent spacecraft structure;

assembling the tested spacecraft payload modules together with the parent spacecraft structure; and testing the assembled spacecraft to ensure that it will operate as intended to perform the mission;

wherein the spacecraft payload modules operate independently of the parent spacecraft structure in most respects.

11. A process as defined in claim 10, further comprising the steps of:

specifying for each of the spacecraft payload modules a structural integrity independent of the parent spacecraft structure; and specifying for each of the spacecraft payload modules a thermal radiator large enough to render each spacecraft payload module thermally independent of the parent spacecraft structure.

12. A process as defined in claim 10, further comprising the steps of:

specifying for each spacecraft payload module a power management capability independent of the parent spacecraft structure.

13. A process as defined in claim 12, wherein the power management capability specified for at least one module includes power regulation.

14. A process as defined in claim 13, wherein the power management capability specified for at least one module includes power storage.

15. A process as defined in claim 14, wherein the power management capability specified for at least one module includes power generation.

16. A process as defined in claim 10, wherein the step of assembling includes attaching each of the spacecraft payload modules to the parent spacecraft structure through a standardized backbone structure that interconnects the modules.

17. A process as defined in claim 16, wherein the backbone structure carries data signals to and from the spacecraft payload modules, and unregulated power to the modules.

\* \* \* \* \*